United States Patent [19]

Cawlfield et al.

[11] Patent Number: 5,248,397
[45] Date of Patent: Sep. 28, 1993

[54] CHLORINE DIOXIDE GENERATION FROM CHLORIC ACID - ALKALI METAL CHLORATE MIXTURES

[75] Inventors: David W. Cawlfield; Sudhir K. Mendiratta; Jerry J. Kaczur, all of Cleveland, Tenn.; Paul J. Craney, Wilton, Conn.

[73] Assignee: Olin Corporation, Cheshire, Conn.

[21] Appl. No.: 829,825

[22] Filed: Feb. 3, 1992

Related U.S. Application Data

[63] Continuation-in-part of Ser. No. 475,603, Feb. 6, 1990, Pat. No. 5,084,148.

[51] Int. Cl.$^5$ .................. C25B 1/26; C01B 11/02
[52] U.S. Cl. .................... 204/95; 204/98; 204/103; 204/129; 423/478
[58] Field of Search ............. 204/95, 98, 101, 103, 204/129, 182.3, 182.4; 210/638; 423/472, 475, 478

[56] References Cited

U.S. PATENT DOCUMENTS

| | | | |
|---|---|---|---|
| 3,810,969 | 5/1974 | Schlumberger | 423/472 |
| 3,904,496 | 9/1975 | Harke et al. | 204/98 |
| 4,036,717 | 7/1977 | Babinsky et al. | 204/153 |
| 4,525,483 | 6/1985 | Grier et al. | 521/28 |
| 4,683,039 | 7/1987 | Twardowski et al. | 204/95 |
| 4,798,715 | 1/1989 | Hardee et al. | 423/478 |
| 4,806,215 | 2/1989 | Twardowski | 204/98 |
| 4,915,927 | 4/1990 | Lipsztajn et al. | 423/472 |
| 4,995,956 | 2/1991 | Mani | 204/182.4 |
| 5,006,211 | 4/1991 | Paleologue et al. | 204/182.4 |
| 5,089,095 | 2/1992 | Cawlfield et al. | 204/95 |
| 5,108,560 | 4/1992 | Cawlfield et al. | 204/103 |

*Primary Examiner*—John Niebling
*Assistant Examiner*—Brian M. Bolam
*Attorney, Agent, or Firm*—Ralph D'Alessandro; F. A. Iskander

[57] ABSTRACT

A process for producing chlorine dioxide is provided which reacts an aqueous solution of chloric acid and an alkali metal chlorate with a solution of a non-oxidizable acid in the presence of an oxygen-evolving catalyst in a reaction zone to produce a gaseous mixture of chlorine dioxide gas, oxygen, water vapor and an aqueous solution of the non-oxidizable acid and an alkali metal salt of the non-oxidizable acid. The gaseous mixture of chlorine dioxide gas and oxygen are separated from the aqueous solution of the non-oxidizable acid and alkali metal salt of the non-oxidizable acid, while the aqueous solution of the non-oxidizable acid and alkali metal salt of the non-oxidizable acid is fed to the anode compartment of three compartment electrolytic cell having at least one ion exchange compartment between an anode and a cathode compartment.

51 Claims, 3 Drawing Sheets

CHLORINE DIOXIDE GENERATION FROM CHLORIC ACID - ALKALI METAL CHLORATE MIXTURES

BACKGROUND OF THE INVENTION

This is a continuation-in-part application of U.S. Ser. No. 07/475,603 filed Feb. 6, 1990 now U.S. Pat. No. 5,084,148.

FIELD OF THE INVENTION

This invention relates to a process for producing chlorine dioxide. More particularly, this invention relates to the production of chlorine dioxide by an integrated process which first electrochemically produces chloric acid - alkali metal chlorate solutions and then chemically catalytically produces the chlorine dioxide from the product solutions.

BRIEF DESCRIPTION OF THE PRIOR ART

Chlorine dioxide has found wide use as a disinfectant in water treatment/purification, as a bleaching agent in pulp and paper production, and a number of other applications because of its high oxidizing power. A variety of chlorine dioxide generator systems and processes are available in the marketplace. Most of the very large scale generators employed, for example, in pulp and paper production, utilize an alkali metal chlorate salt, a reducing agent, and an acid in a chemical process for producing chlorine dioxide. These generators and the processes employed also produce by-product salts such as sodium chloride, sodium sulfate, or sodium bisulfate.

In pulp and paper mills, the typical by-product is sodium sulfate (saltcake) which is converted into a sulfur salt of sodium in a high temperature boiler and used in the paper process. Boilers require energy and paper mills have a limited boiler capacity. Increasing the production of chlorine dioxide generally means increased capital investment to provide the added boiler capacity required to process the added amounts of saltcake by-product produced.

Thus a process which reduces the amount of a by-product salt, such as sodium chloride or sodium sulfate, produced while efficiently generating chlorine dioxide is commercially desirable.

U.S. Pat. 3,810,969 issued May 14, 1974 to A. A. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of HClO3. This process requires the regeneration of the cationic exchange resin with acid to remove the alkali metal ions and the treatment or disposal of the acidic salt solution.

K. L. Hardee et al., in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolyzed solution contains a mixture of chlorine dioxide and chloric acid which is fed to an extractor in which the chlorine dioxide is stripped off. The ion exchange resin is regenerated with hydrochloric acid and an acidic solution of an alkali metal chloride formed.

In U.S. Pat. No. 4,806,215, Twardowski describes a method for producing chlorine dioxide in which the chlorine dioxide is produced in a generator by the reaction of sodium chlorate and hydrochloric acid. After separating chlorine dioxide gas, the remaining sodium chloride solution is fed to the central compartment of a three-compartment cell to form an acidified liquor containing hydrochloric acid. The sodium ions pass through a cation exchange membrane to the cathode compartment to form sodium hydroxide. Sodium hydroxide and the acidified liquor are returned to the chlorine dioxide generator.

Each of the above processes produces a fixed amount and type of by-product salt.

M. Lipsztajn et al., in U.S. Pat. No. 4,915,927 issued Apr. 10, 1990, teach an electrolytic-dialytic process for producing chloric acid and sodium hydroxide from sodium chlorate. The sodium chlorate is fed to the central compartment of a three-compartment cell. Chlorate ions are transferred through an anion-exchange membrane to the anode compartment and sodium ions are passed through a cation-exchange membrane to the cathode compartment.

R. M. Berry et al., (PCT WO 90/10733, Sep. 20, 1990) also teach an electrolytic-dialytic process for producing chloric acid and sodium hydroxide from sodium chlorate. The electrochemical cell uses a three compartment water splitting system comprised of repeating cationic, anionic, and bipolar membranes. An alkali metal chlorate solution is fed into a center salt compartment bounded by an anion membrane and cation membrane, between adjoining acid and base compartments which adjoin the bipolar membranes. The alkali metal ions move under the applied direct current from the salt compartment cation membrane into the acid compartment to form the alkali metal hydroxide, and the chlorate ions move through the salt compartment anion membrane into the acid compartment to form chloric acid.

These problems are solved in the process of the present invention by providing in an integrated process a chlorine dioxide generator and an electrolytic cell that has at least one ion exchange compartment intermediate an anode compartment and a cathode compartment which are separated by an appropriate separator, such as a cation exchange membrane or a porous diaphragm positioned between the anode compartment and the ion exchange compartment.

SUMMARY OF THE INVENTION

It is an object of the present invention to provide an improved process which permits the production of chlorine dioxide free of elemental chlorine without necessarily requiring the addition of a reducing agent.

It is another object of the present invention to provide an improved process which permits a reduction in the amount of acid required and, subsequently, the amount of salt by-product produced in the chlorine dioxide generator.

It is a feature of the process of the present invention that chlorine dioxide can be made from $ClO_3^-$ ions in acidic solution in the presence of an appropriate catalyst alone or with a reducing agent or, alternatively, merely with a reducing agent.

It is another feature of the process of the present invention that the multi-compartment electrolytic cell used in conjunction with the chlorine dioxide generator operates at a current efficiency of greater than about 40 percent, while converting about 100 percent of the sodium values in the sodium chlorate feed to caustic.

It is still another feature of the process of the present invention that the circulating solution from the chlorine dioxide generator back into the anode side of the electrolytic cell provides a means by which the Na+ ions remaining in the effluent from the middle chamber or ion exchange compartment of the cell may be purged without impairing the exchange efficiency of the electrolytic cell.

It is yet another feature of the process of the present invention that the circulation of the circulating solution into the electrolytic cell's anode compartment also serves to cool the cell while providing heat used for the reaction that produces the chlorine dioxide and evaporates the water vapor from the process.

It is still a further feature of the process of the present invention that there is substantially no measurable chloride ion content in the chlorine dioxide generator or the electrolytic cell.

It is an advantage of the process of the present invention that the use of an expensive acid, such as perchloric acid, in the generation of chlorine dioxide is possible since the acid is not consumed during the process.

It is another advantage of the process of the present invention that the electrical energy input to the cell is exactly equal to the thermal energy consumed by the chlorine dioxide generator at steady state operating conditions, thereby requiring no external source of heating or cooling.

It is still another advantage of the process of the present invention that chlorine dioxide is produced that is free of elemental chlorine.

It is yet another advantage of the process of the present invention that the process allows for variability in the composition of the chlorate solution used in the chlorine dioxide generator, while producing an alkali metal hydroxide or an acidic solution of an alkali metal salt as a valuable by-product at reduced energy costs.

It is a further advantage of the process of the present invention that the process can be operated substantially free of effluent solutions which require disposal.

These and other objects, features and advantages are obtained by the process for producing chlorine dioxide which comprises:

a) reacting an aqueous solution of chloric acid and an alkali metal chlorate with a solution of a non-oxidizable acid in the presence of an oxygen-evolving catalyst or reducing agent in a reaction zone to produce a gaseous mixture of chlorine dioxide gas, oxygen, water vapor and an aqueous solution of non-oxidizable acid and alkali metal salts of the non-oxidizable acid and chloric acid;

b) separating the gaseous mixture of chlorine dioxide gas, oxygen and water vapor from the aqueous solution of the non-oxidizable acid and alkali metal salts of the non- oxidizable acid and chloric acid, c) feeding the aqueous solution of the non-oxidizable acid and alkali metal salts of the non-oxidizable acid and chloric acid to the anode compartment of an electrolytic cell having an anode compartment, a cathode compartment, and at least one ion exchange compartment between the anode compartment and the cathode compartment;

d) feeding an aqueous solution of an alkali metal chlorate to the ion exchange compartment;

e) electrolyzing the aqueous solution of the non-oxidizable acid and alkali metal salts of the non-oxidizable acid ions and chloric acid at the anode to produce oxygen gas, hydrogen ions and alkali metal ions;

f) passing alkali metal ions and hydrogen ions from the anode compartment through a cation exchange membrane into the ion exchange compartment, the hydrogen ions displacing alkali metal ions of the alkali metal chlorate to produce an aqueous solution of chloric acid and alkali metal chlorate; and g) passing alkali metal ions from the ion exchange compartment through a cation exchange membrane into the cathode compartment.

BRIEF DESCRIPTION OF THE DRAWINGS

The objects, features and advantages of the invention in producing chlorine dioxide will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
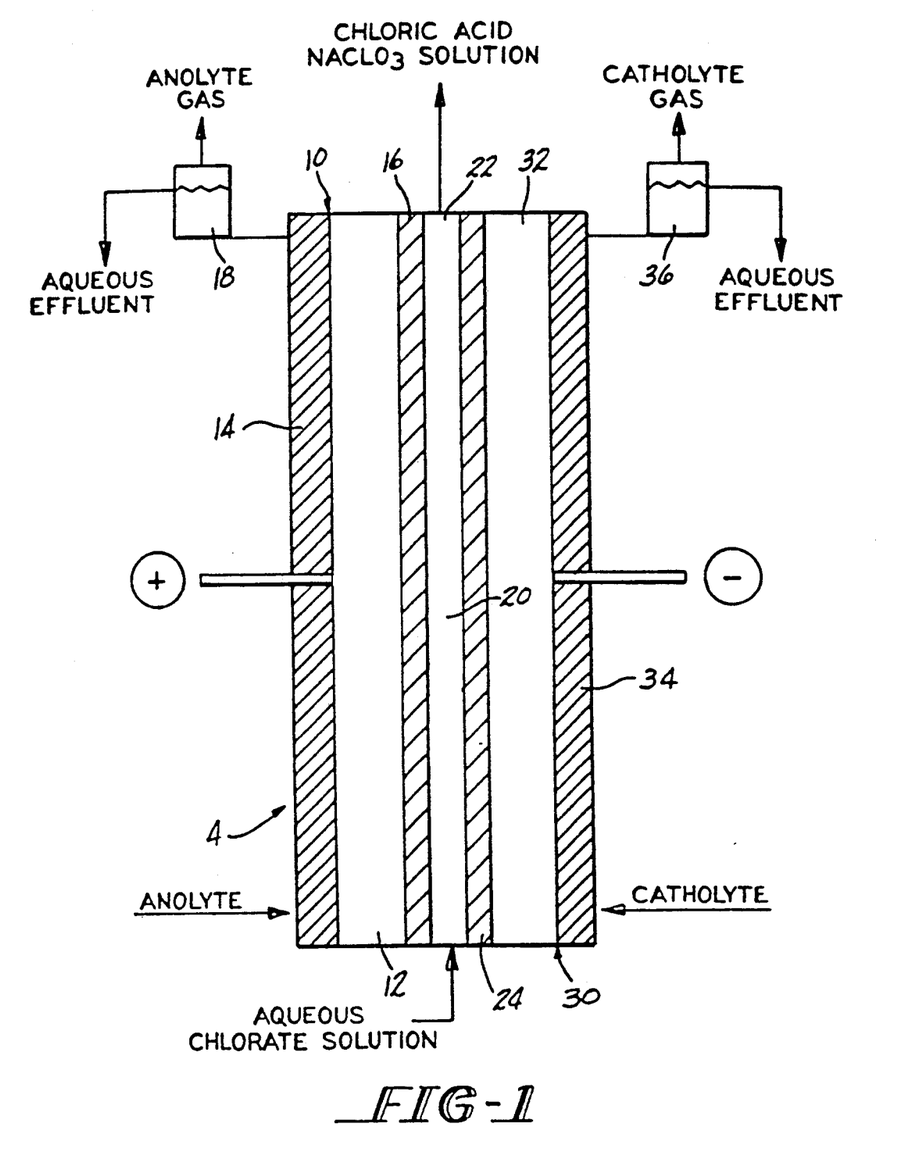
FIG. 1 is a sectional side elevational view of an electrolytic cell which can be employed in the process of the present invention.

FIG. 1 shows an electrolytic cell 4 divided into anode compartment 10, ion exchange compartment 20, and cathode compartment 30 by cation permeable ion exchange membranes 16 and 24. Anode compartment 10 includes anode 12, and anode spacer 14. Anode spacer 14 positions anode 12 with respect to cation permeable ion exchange membrane 16 and aids in the disengagement of anolyte gas produced. Anolyte disengager 18 completes the disengagement of anolyte gas from the spent anolyte solution. Ion exchange compartment 20 includes spacer material 22, which provides a flow channel between cation permeable ion exchange membranes 16 and 24 for the aqueous alkali metal chlorate solution. Cathode compartment 30 includes cathode 32, and cathode spacer 34. Cathode spacer 34 positions cathode 32 with respect to cation permeable ion exchange membrane 24 and aids in the disengagement of catholyte gas produced. The disengagement of catholyte gas from the spent catholyte solution is accomplished in cathode disengager 36.

Figure 2:
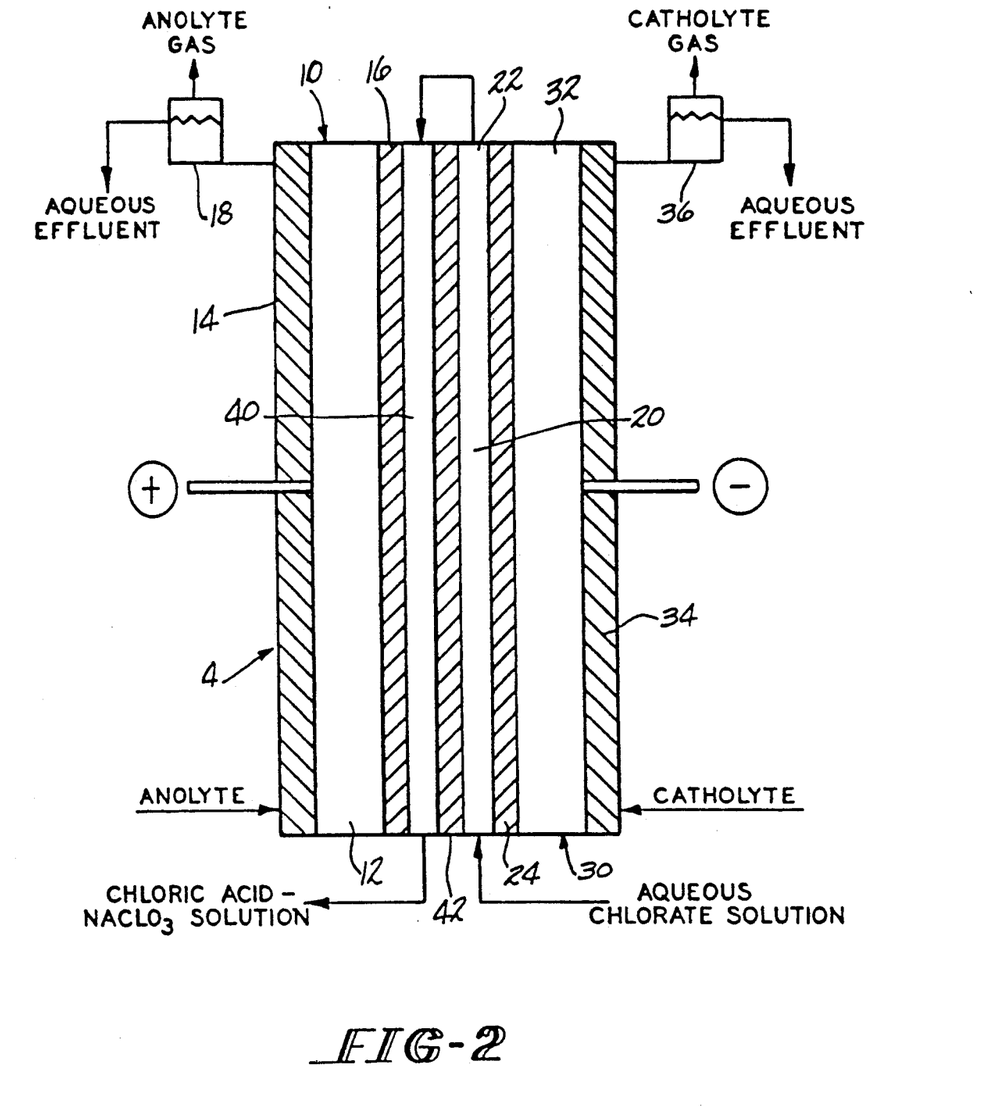
FIG. 2 is a sectional side elevational view of an additional electrolytic cell which can be employed in the process of the present invention.

In FIG. 2, electrolytic cell 4 has been expanded to include a second ion exchange compartment 40, which is positioned between anode compartment 10 and ion exchange compartment 20. Cation permeable ion exchange membrane 42 separates anode compartment 10 from ion exchange compartment 40. The sodium chlorate feed solution enters the lower part of ion exchange compartment 20, flows upwardly and out of ion exchange compartment 20 into the upper part of ion exchange compartment 40. The HClO3/NaClO3 product solution is recovered from the lower part of ion exchange compartment 40.

The flow direction in the ion exchange compartments can also be reversed, for example, with the solution from the top of ion exchange compartment 20 being fed to the bottom of ion exchange compartment 40. The product solution then exits from the top of ion exchange compartment 40.

Figure 3:
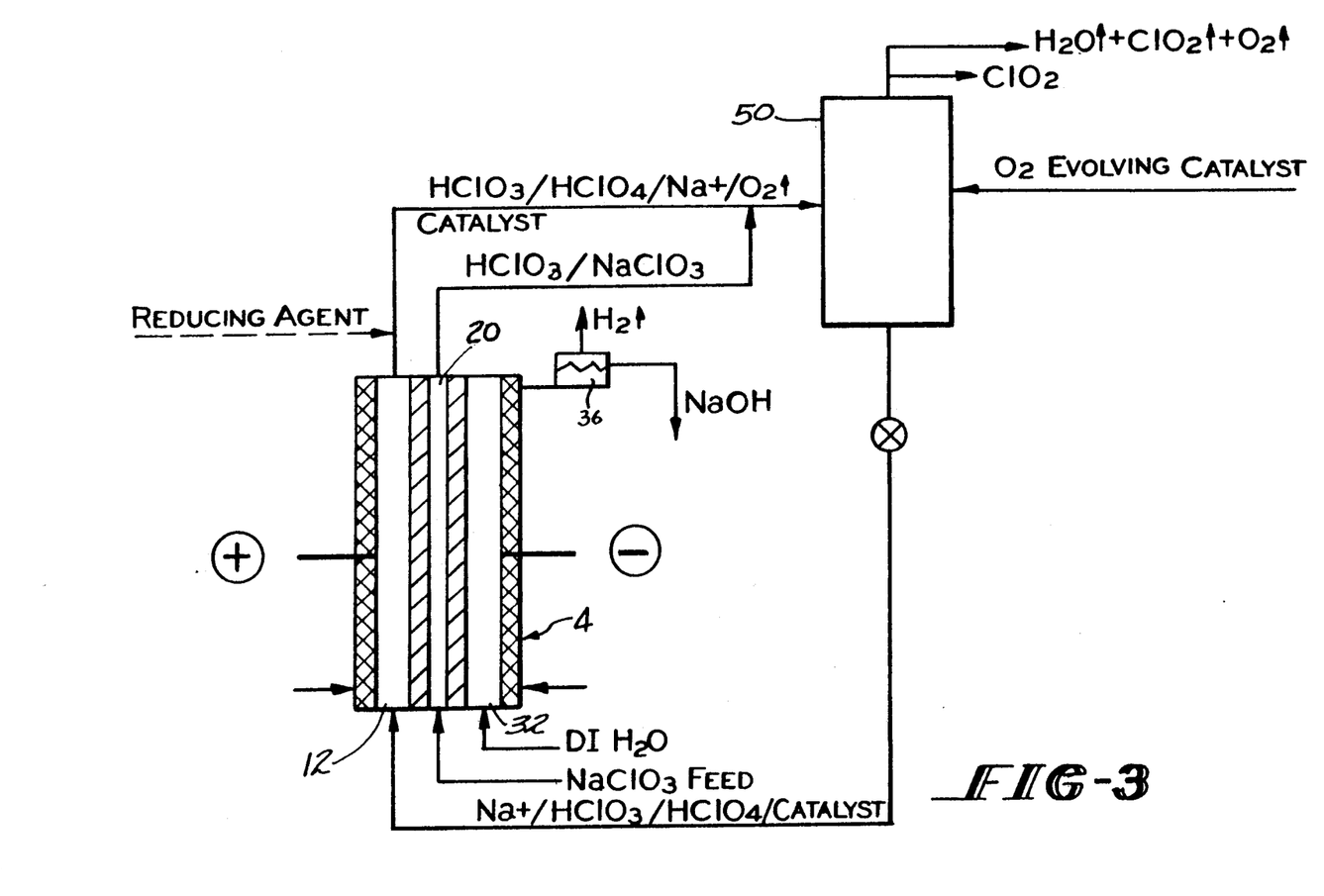
FIG. 3 is a diagrammatic illustration of a preferred system which can be employed with a slurry of an oxygen-evolving catalyst and, alternatively, a reducing agent, in the process of the present invention.

In the preferred embodiment of the process depicted in FIG. 3, a concentrated sodium chlorate solution is fed into the bottom of ion exchange compartment 20 of electrolytic cell 4. Deionized water is fed into the bottom of cathode compartment 30, producing a sodium hydroxide solution product and catholyte hydrogen gas from catholyte disengager 36. The $HClO_3/NaClO_3$ solution from ion exchange compartment 20 of cell 4 is fed to chlorine dioxide generator 50. Also fed to generator 50 is a slurry solution of $HClO_3$ and $HClO_4$ and their sodium salts, suspended oxygen-evolving catalyst particles, and oxygen gas which is produced in anode compartment 10 by the electrolysis of a solution of $HClO_4$, $HClO_3$ and their sodium salts and the suspended oxygen-evolving catalyst recycled by a pump from generator 50. In generator 50, the reaction of the $HClO_3$ and $NaClO_3$ solution with their sodium salts, in the presence of a suspended oxygen-evolving catalyst in solid form, produce a product chlorine dioxide gas with oxygen and water vapor.

An aqueous solution of an alkali metal chlorate is fed to the single or multiple ion exchange compartments of the electrolytic cell. Suitable alkali metal chlorates include sodium chlorate, potassium chlorate and lithium chlorate. In order to simplify the disclosure, the process of the invention will be described using sodium chlorate, which is a preferred embodiment of the suitable alkali metal chlorates. The sodium chlorate feed solution is prepared, for example, by dissolving crystalline sodium chlorate in water. Commercial solid sodium chlorate is suitable as it has a low sodium chloride content and the formation of undesirable amounts of chlorine dioxide and/or chlorine gas is prevented.

Aqueous sodium chlorate feed solutions which may be employed contain any suitable concentrations of sodium chlorate up to about saturation at the temperatures at which the solutions are fed to the ion exchange compartment. For example, solutions having a concentration in the range of from about 1% by weight to about 60% by weight of $NaClO_3$, preferably from about 20 to about 55%, and more preferably from about 30 to about 50% by weight of $NaClO_3$, at temperatures in the range of from about 0° to about 100°, and preferably from about 15° to about 80° C.

The novel process of the invention utilizes an electrochemical cell to generate hydrogen ions that displace or replace a portion of the sodium ions present in the aqueous sodium chlorate solution feed stream.

The generation of hydrogen ions in the process of the present invention in the anode compartment is accompanied, for example, by the oxidation of water at the anode into oxygen gas and $H^+$ ions by the electrode reaction as follows:

(4) $2H_2O \rightarrow O_2 + 4H^+ + 4e^-$

The anode compartment contains as an anolyte a highly acidic solution of a non-oxidizable acid and an alkali metal salt of the non-oxidizable acid and chloric acid. Non-oxidizable acids which may be used include sulfuric acid, phosphoric acid, perchloric acid and mixtures thereof. Preferably the non-oxidizable acid is sulfuric acid or perchloric acid, with perchloric acid being more preferred. The anolyte employed is preferably produced in the chlorine dioxide generator during the production of chlorine dioxide by the catalyzed reaction of the chloric acid/sodium chlorate solution with the non-oxidizable acid solution. This solution is highly acidic, containing about 3.0 molar total acidity or more and having no measurable amounts of chloride ion present.

The anode compartment contains an anode capable of producing hydrogen ions in a strong acidic medium with an applied DC electrical current. The preferred anode has an electrocatalyst coating which is capable of evolving oxygen with hydrogen ions. Any suitable anode may be employed in the anode compartment, including those which are available commercially as dimensionally stable anodes, which are stable in the highly acidic anolyte solution. The anodes employed contain as electrocatalysts platinum group metals, platinum group metal alloys or platinum group metal oxides, including coatings of these materials on various electrically conductive substrates such as the valve metals i.e., titanium, tantalum and the like. Preferably, the anodes contain oxides of platinum group metals such as iridium, rhodium or ruthenium which are coated on a valve metal substrate. These anodes may also contain valve metal protection barrier layers underneath the oxygen electrocatalyst coating layer comprising valve metal oxides or mixtures of valve metal oxides with the platinum group metal oxides. Commercially available oxygen-evolving anodes which are suitable include those manufactured by Englehard (PMCA 1500) or Eltech (TIR-2000).

Where a solid oxygen-evolving catalyst in particulate form as a slurry is used in the chlorine dioxide generator, particles of the catalyst may be included in the acidic solution recycled from the generator to the anode compartment. In this embodiment where the oxygen-evolving catalyst is a particulate solid present in the anolyte, the anode is preferably spaced apart from the membrane as oxygen is formed and the anode potential is reduced. The use of the oxygen-evolving catalyst serves to provide active sites near the anode for oxygen evolution and thus prevents anode deactivation in the highly acidic anolyte solution.

Temperatures of the anolyte during electrolysis are maintained in the range of from about 30° to about 110° C., and preferably at from about 40° to about 100° C., and more preferably 60° to 80° C.

To prevent the buildup of heat in the anolyte compartment and to supply heat to the chlorine dioxide generator, the anolyte is circulated at a rate sufficient to transfer heat from the anode compartment to the chlorine dioxide generator. Suitable circulation rates include those in the range of from about 1 to about 5000, and preferably from about 5 to about 2000 reactor volumes per hour. The heating requirements of the generator are defined primarily by the amount of water vapor removed. The water vapor removed in the chlorine dioxide containing product gas and the caustic product stream must balance the total amount of water entering the process with sodium chlorate solution. This heat of evaporation is preferably supplied entirely by excess heat from the electrolyzer, thus avoiding the need for a heat exchanging device.

During electrolysis of the anolyte, the hydrogen ions generated in the anode compartment as well as smaller amounts of sodium ions pass through a cation exchange membrane into the ion exchange compartment containing the sodium chlorate solution. As a hydrogen ion enters this solution, a sodium ion is displaced and by electrical ion mass action and passes through the cation membrane adjacent to the cathode compartment into the cathode compartment to maintain electrical neutrality.

The novel process of the invention as operated results in a wide range of conversions of sodium chlorate to chloric acid, for example, from about 1 to about 99.9%, preferably from about 5 to about 95, and more preferably from about 15 to about 90%.

The sodium chlorate feed solution concentration, the residence time in the ion exchange compartment as well as the cell amperage are factors that affect the extent of the conversion of sodium chlorate to chloric acid.

Using very dilute solutions of sodium chlorate, high percentages of conversion of NaClO3 to chloric acid can be achieved, i.e. up to 99.9% conversion. For a single pass flow through system, typical residence times in the ion exchange compartment are between about 0.1 to about 120 minutes, with a more preferred range of about 0.5 to about 60 minutes.

Thus, the concentration of sodium chlorate in the solution fed to the ion exchange compartment and the flow rate of the solution through the ion exchange compartment are not critical and broad ranges can be selected for each of these parameters.

In the novel process of the present invention the electrolytic cell is operated at a current density of from about 0.01 KA/m2 to about 10 KA/m2, with a more preferred range of about 0.05 KA/m2 to about 3 KA/m2.

Current efficiencies during operation of the process of the invention can be increased by employing additional ion exchange compartments, as illustrated by FIG. 2, which are adjacent and operated in a series flow pattern.

Adjusting the width of the ion exchange compartment can also alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which can be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums which may be employed include carboxylic acid, sulfonic or sulfuric acids, and acids of phosphorus such as phosphonous, phosphonic or phosphoric. The cation exchange resins are suitably ionically conductive so that a practical amount of current can be passed between the cation exchange membranes used as separators. Various percentage mixture of resins in the hydrogen form and the sodium form may be used in various sections of the ion exchange compartments on assembly to compensate for the swelling and contraction of resins during cell operation. For example, percentage ratios of hydrogen form to sodium form may include those from 50 to 100%.

The use of cation exchange resins in the ion exchange compartment can serve as an active mediator which can exchange or adsorb sodium ions and release hydrogen ions. The hydrogen ions generated at the anode thus regenerate the resin to the hydrogen form, releasing sodium ions to pass into the cathode compartment. Their employment is particularly beneficial when feeding dilute sodium chlorate solutions as they help reduce the cell voltage and increase conversion efficiency.

Preferred as cation exchange mediums are strong acid type cation exchange resins in the hydrogen form as exemplified by low cross-linked resins such as those sold under the tradename AMBERLITE IRC-118 (Rohm and Haas Co.), as well as higher cross-linked resins, such as AMBERLITE IRC-120. High surface area macro-reticular or microporous type of ion exchange resins having sufficient ionic conductivity in the ion exchange compartments are also suitable.

Physical forms of the cation exchange resin which can be used are those which can be packed into compartments and include beads, rods, fibers or a cast form with internal flow channels. The bead forms of the resin are preferred.

Cation exchange membranes which are suitable as separators between compartments are inert and are substantially impervious to the hydrodynamic flow of the alkali metal chlorate solution, or the electrolytes, and any gas products produced in the anode or cathode compartments. Cation exchange membranes are well-known to contain fixed anionic groups that permit intrusion and exchange of cations, and exclude anions from an external source. Generally the resinous membrane or diaphragm has a cross-linked polymer as a matrix, to which are attached charged radicals, such as —SO3- —and/or mixtures thereof with —COOH—.

The resins which can be used to produce the membranes include, for example, fluorocarbons, vinyl compounds, polyolefins, hydrocarbons, and copolymers thereof. Preferred are cation exchange membranes such as those comprised of fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups produced by suitable processes, including hydrolysis.

Suitable cation exchange membranes are readily available, being sold commercially, for example, by Ionics, Inc., Sybron, E. I. DuPont de Nemours & Co., Inc. under the trademark "NAFION", the Asahi Chemical Company under the trademark "ACIPLEX", and Tokuyama Soda Co. under the trademark "NEOSEPTA". Included among these are the perfluorinated sulfonic acid type membranes which are resistant to oxidation and high temperatures, such as DuPont NAFION types 117, 417, 423, etc., membranes from the assignee of U.S. Pat. No. 4,470,888, and other polytetrafluoroethylene based membranes with sulfonic acid groupings, such as those sold under the RAIPORE tradename by RAI Research Corporation.

The catholyte can be any suitable aqueous solution, including neutral or alkaline salt solutions, and any appropriate acids such as hydrochloric, sulfuric, phosphoric, nitric, acetic or others.

In a preferred embodiment, the catholyte in the cathode compartment is deionized or softened water, or dilute sodium hydroxide solutions which produce an alkali metal hydroxide solution. The water selection is dependent on the desired purity of the alkali metal hydroxide by-product. The cathode compartment may also contain a strong acid cation exchange resin in a cation form, such as sodium, as the electrolyte.

Any suitable cathode which generates hydrogen gas may be used, including those, for example, based on nickel or its alloys, including nickel-chrome based alloys; steel, including stainless steel types 304, 316, 310, etc.; graphite; graphite felt; a multiple layered graphite cloth; a graphite cloth weave; carbon; and titanium or other valve metals, as well as valve metals having coatings which can reduce the hydrogen overvoltage of the cathode. The cathode is preferably perforated to allow for suitable release of the hydrogen gas bubbles produced at the cathode particularly where the cathode is placed against the membrane.

Optionally a porous spacer material, such as a chemically resistant and non-conductive plastic mesh or a conductive material like graphite felt, can be positioned behind the anode and/or the cathode to support the electrodes. This will also permit the adjustment of the gap between the electrode and the cation permeable ion exchange membrane, for example, when using high open area expanded metal electrodes. The porous spacer material preferably has large holes for ease of disengagement of the gases from the anolyte and/or catholyte. A thin protective spacer can also be placed between the anode and/or the cathode and the cation permeable ion exchange membranes. This spacer can be a non-conductive plastic or a porous conductive material like graphite felt. The cell may be operated with the electrode in contact with the thin protective spacer and the porous spacer material, or with the membrane in direct contact with the electrode and with or without the porous spacer material.

The conversion of alkali metal ions from the ion exchange compartment to an alkali metal hydroxide solution at the cathode also results in the formation of hydrogen. The process of the invention may be operated to convert 100% of the alkali metal ions, while achieving good current efficiencies of 40% or greater.

It will be recognized that other configurations of the electrolytic cell can be employed in the novel process of the present invention, including bipolar cells utilizing a solid plate type of anode/cathode or bipolar membranes. For example, a bipolar electrode could include a valve metal, such as titanium or niobium sheet clad to stainless steel. The valve metal side could be coated with an oxygen evolution catalyst and would serve as the anode. An alternative anode/cathode combination which is commercially available is a platinum clad layer on stainless steel or niobium or titanium and is prepared by heat/pressure bonding.

The solution of chloric acid and alkali metal chlorate produced in the process of the present invention contains a wide range of concentrations and ratios of chloric acid to alkali metal chlorate. For example, the solutions produced can provide molar ratios of chloric acid to alkali metal chlorate of from about 0.1:1 to about 250:1. Where the product solutions are to be used in the known processes for the generation of chlorine dioxide, suitable molar ratios of chloric acid to alkali metal chlorate of from about 0.3:1 to about 200:1, and preferably from about 1:1 to about 100:1. Improved current efficiencies are attained in the novel process of the present invention when the molar ratio of alkali metal ion to hydrogen ion in the solution produced is in the range of from about 0.1:1 to about 4:1, and preferably from about 0.5:1 to about 3:1.

These solutions of chloric acid and alkali metal chlorate are highly acidic and can be used without requiring additional acids, or where additional acids are employed, permit a substantial reduction in the amount of acid employed in the generation of chlorine dioxide.

Where the solutions are to be fed to a generator for chlorine dioxide without additional acid, it is desired that ratio of total chlorate, provided by $HClO_3$ and an alkali metal chlorate such as $NaClO_3$, to the water present in the solution be greater than about 0.155. While the required concentrations of $HClO_3$ and, for example, $NaClO_3$ vary somewhat with the temperature of the solution, employing weight percent ratios of $HClO_3$ to $NaClO_3$ of about 2.7 or greater will readily provide the desired total chlorate to water ratio. Solutions of these concentrations of $HClO_3$ could be produced directly in the electrochemical cell. However, it may be desirable to concentrate the $HClO_3$ in the product solutions after removal from the cell since crystals of the alkali metal chlorate may be formed during the concentration step.

The product solutions may be concentrated, for example, by evaporation at sub-atmospheric pressures and temperatures of less than about 100° C., for example, in the range of from about 30° to about 90° C., and preferably, from about 50° to about 80° C. Solutions containing up to about 50% by weight of chloric acid, and preferably in the range of from about 30 to about 40% by weight of chloric acid, may be produced in this manner.

Freeze concentration may be used to separate sodium chlorate from the chloric acid solution and thus concentrate the remaining chloric acid simultaneously. As the solution of chlorate and chloric acid is chilled, ice and sodium chlorate will crystallize simultaneously and in separate phases. The solution will be enriched in chloric acid and reduced in water content until a eutectic point is reached at which chloric acid (hydrate) also crystallizes. This eutectic point is believed to occur at a solution concentration of about 30 to about 35% chloric acid by weight. During the practice of freeze concentration it is also possible to recycle the melted ice, along with the sodium chlorate which dissolves as the ice melts, for the purpose of preparing new sodium chlorate solution for feed to the process of this invention. An alternate embodiment includes a combination of freeze concentration followed by vacuum evaporation to further concentrate the chloric acid.

The production of solutions having a wide range of concentrations of chloric acid and sodium chlorate for use in chlorine dioxide generators can be achieved. The product solution can be fed directly from the ion exchange compartment of the electrolytic cell to a commercial chlorine dioxide generator.

Typical commercial processes are those which use sulfuric acid or hydrochloric acid with a reducing agent, such as sulfur dioxide or methanol, in the presence of a salt such as sodium chloride. Commercial chlorine dioxide processes which may use the aqueous solutions of chloric acid and alkali metal chlorate of the present invention include the Mathieson, Solvay, R2, R3, R8, Kesting, SVP, and SVP/methanol processes, among others.

To increase yields of chlorine dioxide and conversion efficiencies, the process of the invention is carried out in the presence of a solid surface which promotes oxygen evolution. Any solid surface may be used which facilitates oxygen formation, including oxygen-evolving catalysts. Suitable as oxygen-evolving surfaces or catalysts are, for example, metals and oxides of the elements of Group VIII of the Periodic Table of Elements (Webster's Third New International Dictionary of the English Language, Unabridged, 1986, p. 1680). Thus metals, such as the platinum group metals including platinum, palladium, osmium, iridium, rhodium or ruthenium; and mixtures or alloys of these platinum group metals may be employed. Additionally oxides of platinum group metals, such as palladium, osmium iridium, rhodium or ruthenium, as well as mixtures of these oxides with platinum group metals or alloys of these precious metals, could be suitably employed. Likewise, iron alloys, such as stainless steel, nickel or nickel based alloys, and cobalt based alloys, can be used as oxygen-evolving catalysts in the process of the invention. Other oxygen-evolving catalysts include semiconductive ceramics known as perovskites. The catalyst may be present as particles suspended in the reaction mixture or supported on an inert substrate. The oxygen-evolving catalysts may be used in the forms of a packed bed, slurries, or any structure which will suitably promote mass transfer. In the preferred embodiment of this invention, the catalyst is present in a slurry of fine particles. Since these particles remain suspended in the reaction solution, even as it circulates through the anolyte compartment of the electrolyzer, they can function as oxygen evolution catalysts in the electrolyzer as well. In an alternate, but less preferred embodiment of this invention, the catalyst is deposited on valve metal heat exchanger surfaces, or on a fixed bed of valve metal fibers or beads. This fixed bed can be located in a vessel by itself, or can be located in the anolyte compartment of the electrolyzer. Suitable valve metals include titanium and tantalum, among others.

The process permits flexibility in any by-product salts which may be produced, as well as allowing the recovery of energy costs by producing, for example, an alkali metal hydroxide solution by-product. Further the process reduces operating costs by eliminating process steps and equipment from processes presently available.

The operation of the electrochemical unit in a no salt effluent chlorine dioxide generation system must be controlled so that at steady state operation, the applied current is sufficient to produce an equimolar ratio of caustic to the sodium chlorate fed to the electrochemical cell ion exchange compartment. To achieve this balance, the intermediate stream leaving the ion exchange compartment containing a mixture of sodium chlorate and chloric acid will normally have a molar ratio of chloric acid to total chlorate ion of between about 1:1.15 to about 1:4, and more preferably between about 1:2 to about 1:3. The electrochemical reactions at an oxygen evolving anode can produce additional perchloric acid from a generator output stream containing perchloric acid, chloric acid and their sodium salts by oxidation of part of the chloric acid in the stream according to the reaction:

(5) $HClO_3 + H_2O \rightarrow HClO_4 + 2H^+ + 2e^-$

The percentage of chloric acid oxidation to perchloric acid in the anolyte compartment per pass depends on the operating current density of the anode, acidity and concentrations of the anolyte solution, as well as the composition of the anode electrocatalyst coating. For example, ruthenium oxide based anode coatings will produce only small amounts of perchloric acid from chloric acid, while the reactions on a platinum metal can produce significant amounts of perchloric acid.

During steady state operation of the process, small amounts of perchloric acid or other non-oxizable acid may be consumed by decomposition, or entrainment in the product gas. The anode can thus be fabricated with different combinations and compositions of anode coatings to meet the steady state non-oxidizable acid makeup requirements of the chlorine dioxide generation system.

To further illustrate the invention the following examples are provided without any intention of being limited thereby. All parts and percentages are by weight unless otherwise specified.

EXAMPLE 1

An electrochemical cell of the type shown in FIG. 1 consisting of three compartments was machined from ultra high density polyethylene (UHDPE), having an anode compartment, a central ion exchange compartment, and a cathode compartment. The about ½ inch (1.27 cm.) thick anode compartment contained a titanium mesh anode having an oxygen-evolving anode coating (PMCA 1500, Englehard Corporation, Edison, N.J.). The anode was supported and spaced apart from the UHDPE back wall using multiple layers of polyethylene mesh having about ¼ inch square holes and being about 1/16 inch in thickness. A polyethylene mesh spacer was positioned between the anode and adjoining membrane to provide an anode-membrane gap of 0.0625 inch (0.1588 centimeters). The anode compartment was filled with about a 2.0 percent by weight sulfuric acid solution.

The about ½ inch (1.27 cm.) thick cathode compartment contained a 304 stainless steel perforated plate cathode mounted flush to the surface of the cathode compartment with the polyethylene mesh spacers. The cathode was positioned in contact with the adjacent membrane, providing a zero gap configuration. The cathode compartment was initially filled with a sodium hydroxide solution (about 2% by weight) as the catholyte.

Separating the anode compartment from the ion exchange compartment, and the ion exchange compartment from the cathode compartment were a pair of perfluorosulfonic acid cation permeable membranes with a 985 equivalent weight, obtained from the assignee of U S. Pat. No. 4,470,888. The ion exchange compartment was a machined about ¼ inch (0.625 cm) thick frame with inlet and outlet ports and contained the polyethylene mesh spacers to distribute the chlorate solution, as well as to support and separate the two membranes.

An aqueous sodium chlorate solution containing about 20 weight percent of $NaClO_3$ was prepared by dissolving reagent grade sodium chlorate in deionized water. During operation of the electrolytic cell, the chlorate solution was metered into the bottom of the ion exchange compartment in a single pass process at feed rates varying from about 7.0 g/min. to about 14.4 g/min. Electrolyte circulation in the anode and cathode compartments was by gas lift effect only. The cell was operated employing a cell current of about 24.5 amperes at a current density of about 1.20 KA/m2. The cell voltage varied according to the cell operating temperature. A sample of the product solution was taken at each flow rate, the temperature measured, and the product solution analyzed for chloric acid and sodium chlorate content. The product solutions were colorless, indicating no chlorine dioxide was formed in the ion exchange compartment. The concentration of the sodium hydroxide catholyte during cell operation increased to about 12 percent by weight. The results are given in Table I below.

rine dioxide or chlorine in the chloric acid-sodium chlorate solution product.

EXAMPLE 3

An electrochemical cell was constructed similar to

TABLE I

| Cell Volts | Cell Amps | NaClO$_3$ Flowrate (gm/min) | HClO$_3$—NaClO$_3$ Product | | | | Conversion % to HClO$_3$ | C.E. % | Residence Time (min) | KWH/TON of HClO$_3$ |
|---|---|---|---|---|---|---|---|---|---|---|
| | | | Product Temp (°C.) | HClO$_3$ Wt % | NaClO$_3$ Wt % | HClO$_3$:NaClO$_3$ Molar Ratio | | | | |
| 5.00 | 24.5 | 14.40 | 30.0 | 5.96 | 12.49 | 0.60 | 38.00 | 69.50 | 11.38 | 2082 |
| 4.87 | 24.5 | 12.35 | 42.0 | 6.51 | 11.80 | 0.70 | 41.00 | 65.20 | 13.27 | 2152 |
| 4.76 | 24.5 | 10.00 | 45.0 | 7.24 | 10.88 | 0.84 | 45.60 | 58.60 | 16.39 | 2336 |
| 4.50 | 24.5 | 7.17 | 50.0 | 8.34 | 9.49 | 1.11 | 52.60 | 48.50 | 22.86 | 2674 |
| 4.44 | 24.5 | 7.00 | 54.0 | 8.43 | 9.38 | 1.13 | 53.10 | 47.80 | 23.41 | 2673 |

EXAMPLE 2

The electrochemical cell of FIG. 2 was employed having a second ion exchange compartment adjacent to the first ion exchange compartment. The anode compartment contained the same type of anode as was used in Example 1 and was filled with a strong acid hydrogen form cation exchange resin (AMBERLITE IRC-120 plus, Rohm & Haas Company) as the electrolyte. A perfluorinated sulfonic acid-based membrane (DuPont NAFION 417) separated the anode compartment from the first ion exchange compartment. The two ion exchange compartments were fully filled with AMBERLITE IRC-120 Plus cation exchange resin in the hydrogen form and were separated by a DuPont NAFION 417 membrane. The same membrane was employed to separate the second ion exchange compartment from the cathode compartment. The cathode compartment contained a perforated 304 stainless steel cathode and was filled with a sodium form AMBERLITE IRC-120 Plus cation exchange resin. Both the anode compartment and the cathode compartment were filled with deionized water. The sodium chlorate solution fed to the ion exchange compartments was prepared from reagent grade sodium chlorate dissolved in deionized water to form about a 16 weight percent solution as sodium chlorate. The sodium chlorate solution at about 20° C. was fed to the bottom of ion exchange compartment 20 adjacent to the cathode compartment at a flow rate of about 6.5 grams per minute. The chloric acid-sodium chlorate solution flow from the upper part of ion exchange compartment 20 was routed into the bottom of ion exchange compartment 40 adjacent to the anode compartment and collected from the top of ion exchange compartment 40. The total residence time of the solution in the ion exchange compartments was about 42 minutes.

During operation of the cell, the cell current was set at a constant 23.0 amperes for an operating current density of about 1.5 KA/m2. The cell voltage stabilized at about 9.60 volts, and the product temperature was about 65° C. Circulation in the anode and cathode compartments of the electrolyte was by gas lift effect and the liquid level of the gas disengagers was set at about 3 inches (7.62 cm) above the height of the cell.

The product solution from the cell contained about 11.44 weight percent HClO$_3$, which represented about a 90% conversion of the sodium chlorate to chloric acid. The current efficiency was determined to be about 61.6% and the power consumption was about 4490 KwH/Ton of HClO$_3$. The product solution was light yellow in color, indicating the presence of some chlothat of FIG. 1 consisting of three compartments. The anolyte and catholyte compartments were machined from about 1 inch (2.54 cm) thick natural polyvinylidene difluoride (PVDF). The outside dimensions of both the anolyte and catholyte compartments were about 5 inches (12.7 cm) by about 14 inches (35.56 cm), with machined internal dimensions of about 3 inches (7.62 cm) by about 12 inches (30.48 cm) by about 0.250 inch (0.635 cm) deep. Flow entry and exit ports, as well as flow distributions holes, were drilled from the outside of the frame to the central recess area for flow into and out of the compartments.

The central ion exchanging compartment was machined from about 1 inch (2.54 cm) thick natural PVDF with outside dimensions of about 5 inches (12.7 cm) by about 16 inches (40.64 cm) to about a ⅛" (0.317 cm) by about 5 inches (12.7 cm) by about 14 inches (35.56 cm) thick center area with a central about 3 inches (7.62 cm) by about 13 inches (33.02 cm) area cutout. The about 1 inch (2.54 cm) by about 1 inch top and bottom ends were drilled with a single central hole to form entry/exit ports and tapped to accept about ¼ inch NPT pipe thread fittings. A series of about 0.055 inch (0.1397 cm) holes were drilled about every ½ inch (1.27 cm) from the central cutout area into the flow distribution hole in the about 1 inch by about 1 inch entry/exit ends of the ion exchanging compartment frame. These flow distribution holes go through the ⅛ inch thickness of the central part of the frame.

The anolyte compartment was fitted with an open diamond pattern nonflattened expanded sheet prepared from about 0.060 inch (0.1524 cm) thick titanium with the expanded metal sheet having a total depth of about 0.140 inch (0.3556 cm) by about 3 inches (7.62 cm) wide by about 12 inches (30.48 cm) long dimensions. About a ½ inch (1.27 cm) wide by about 12 inches (30.48 cm) long by 1/16 inch (0.0625 cm) thick titanium current distributor strip was welded at multiple points to the backside of the expanded titanium sheet.

Two ½ inch (1.27 cm) diameter titanium current conductor posts were then welded to the back side of the flat titanium current distribution strip. The expanded titanium surfaces were then plated with a layer of metallic platinum approximately 2 micron (78 microinch) thick by a brush electroplating method using a diluted chloroplatinic acid solution. The anode structure was then mounted into the recess inside the anolyte compartment using one or more layers of about 1/16 inch (0.1588 cm) thick expanded polytetrafluorethylene mesh behind the anode to make the anode surface flush with the inside surface of the anolyte compartment.

The catholyte compartment was fitted with about a 1/16 inch (0.1588 cm) thick by about 3 inches (7.62 cm) by about 12 inches (30.48 cm) type 316L stainless steel perforated plate having two ½ inch (1.27 cm) diameter 316L stainless conductor posts welded on the back side. The cathode plate was mounted in the recess inside the catholyte compartment using two layers of about 1/16 inch (0.1588 cm) thick expanded polytetrafluorethylene mesh behind the cathode plate to make the cathode surface flush with the inside surface of the catholyte compartment.

The electrochemical cell assembly was completed using about 0.040 inch (0.1016 cm) thickness polytetrafluorethylene compressible GORE-TEX gasket tape (W. L. Gore & Associates, Elkton, Md.) on the sealing surfaces of all the compartment cell frames. Two layers of a lose woven polytetrafluoroethylene filament with about a 1/16 inch (0.1588 cm) thickness were laid in place in the central ion exchange compartment to provide for flow distribution and physical formation of the flow channel. DuPont NAFION 324 perfluorinated sulfonic acid cation permeable type membranes were then mounted between the central ion exchange compartment and the anolyte and catholyte compartments.

The above cell was operated with a reagent grade about 47.15 wt % sodium chlorate solution fed at a flowrate of about 11.17 gm/min into the bottom of the central ion exchange compartment. Deionized water was metered into the bottom of the catholyte compartment at a flowrate of about 10.40 gm/min. The anolyte was about a 30 wt % sulfuric acid which was recirculated at a flowrate of about 50 gm/min with a pump. The applied cell current was about 70 amperes for a current density of about 3 KA/m2 and the cell voltage was about 5.55 volts. A slightly yellow product solution exited the central ion exchanging compartment at a temperature of about 80° C. and, upon analysis, had a composition of about 18.17 wt % $HClO_3$, about 26.47 wt % $NaClO_3$, (total as $ClO_3^-$, about 38.71 wt %) and $HClO_4$ content of less than about 0.03 wt %. The catholyte product contained about 7.33 wt % NaOH at an output flowrate of about 12.14 gm/min. The calculated cell operating current efficiency based on the NaOH produced was about 51.1%, and about 51.7% based on the $HClO_3$ present in the product.

Chloric acid/sodium chlorate solution products from the above cell during several runs provided a composite solution containing about 20.0 wt % $HClO_3$ and about 22 wt % $NaClO_3$, [equivalent to a total chlorate ion ($ClO_3^-$) content of about 37.0 wt %]. The total chlorate ($ClO_3^-$) content was determined by a standard iodimetric method using concentrated HCl and titration with thiosulfate.

The perchloric acid ($HClO_4$) concentration was determined by ion chromatography using dissolved sodium perchlorate solutions as standards. The sodium chlorate content of the samples were calculated by difference.

About 500 ml of the above clear, water color solution was placed in a 1 liter vacuum filter flask fitted with a thermometer, polytetrafluoroethylene coated magnetic stirring bar, and a 28 mm Hg vacuum water aspirator source. The flask was then placed on a hot plate/magnetic stirrer and heated while the vacuum was applied. The solution was vacuum evaporated in a temperature range between about 50° C.-80° C. Approximately 50 to 100 ml samples of the solution were periodically removed during the vacuum evaporation process. The first three samples showed no precipitates in the hot solution upon sampling. The fourth and final sample was obtained when a significant amount of sodium chlorate crystals had accumulated in the vacuum flask at about 60° C. There was a slight yellow color in the solution phase.

All of the samples were then cooled in stoppered flasks in a cold water bath to about 20° C. for a period of about 1.5 hours to allow the solution to come to equilibrium with the precipitated $NaClO_3$ salt phase. Samples of the water colored supernatants were then removed for analysis. The chloric acid ($HClO_3$) content was determined by titration with NaOH.

The results are listed in Table II below.

TABLE II

| Sample No | $HClO_3$ Wt % | $ClO_3^-$ wt % | $NaClO_3$ wt % | $HClO_4$ wt % | $ClO_3^-/H_2O$ wt % Ratio | $ClO_3/H_2O$ Molar Ratio |
|---|---|---|---|---|---|---|
| 1 | 21.33 | 37.82 | 21.36 | <0.03 | 0.660 | 0.142 |
| 2 | 25.26 | 38.42 | 17.17 | <0.03 | 0.667 | 0.144 |
| 3 | 29.75 | 40.04 | 13.57 | <0.03 | 0.706 | 0.152 |
| 4 | 35.85 | 42.73 | 9.32 | <0.03 | 0.779 | 0.168 |

Note: Ion Chromatography Detection Limit For $HClO_4$ Was 0.03 wt %.

EXAMPLE 4

The apparatus of Example 3 was used to produce about 150 grams of an $HClO_3/NaClO_3$ solution having a composition of about 19.24 wt % $HClO_3$ and about 27.64% $NaClO_3$, with a total $ClO_3^-$ content of about 40.68 wt %. The solution was evaporated at temperatures between about 40° C.-60° C. under a vacuum of about 28-30 mm Hg. Sodium chlorate crystals precipitated in the solution in significant amounts after ⅝ of the solution had been evaporated. The solution phase had a slight yellow color toward the end of the hot evaporation and disappeared upon cooling the solution to room temperature with applied vacuum. The solution phase from the flask was decanted from the solids and cooled in a stoppered flask in an ice bath to about 5° C. The solution phase was then decanted from the sodium chlorate crystal solids and analyzed.

The solution phase contained about 43.02 wt % as $HClO_3$ and about 45.24 wt % as $ClO_3^-$. This calculates to about 3.48 wt % as $NaClO_3$. Ion chromatographic analysis showed that the $HClO_4$ content of the solution was less than about 0.03 wt %. A sample of about 2.025 grams of the product solution was carefully evaporated to dryness on a hot plate to about 250° C. for an actual sodium chlorate residual analysis check. The final weight of the sodium chlorate deposit residual in the sample was found to be about 0.065 gram or about 3.21 wt % as $NaClO_3$. This is in close agreement with the calculated 3.48 wt % value.

COMPARATIVE EXAMPLE A

About 150.00 grams of a solution containing about 19.24 wt % $HClO_3$ and about 27.64 wt % $NaClO_3$, as was used in Example 4, was evaporated by boiling in a 250 ml beaker on a hot plate. The solution boiled at an increasing value from an initial temperature of about 105° C.-107° C. to about 115° C. at the end of the run. After boiling the solution had a deep yellow color and the final weight of the solution was about 116.35 grams.

After cooling to room temperature, sodium chlorate solids precipitated. About 46.88 grams of liquid was decanted from the sodium chlorate solids. The liquid decant was then further cooled in an ice bath to about 5° C. The clear decant was analyzed and found to contain about 27.88 wt % $HClO_3$ and about 1.66 wt % $HClO_4$ by ion chromatography. The residual $NaClO_3$ content of about 13.47 wt % was determined by evaporating about a 2.005 grams sample of the liquid to obtain about 0.270 gram of solids.

EXAMPLES 5-10

About 300 ml of $HClO_3/NaClO_3$ product solution having a composition of about 19.24 wt % $HClO_3$ and about 27.64 wt % $NaClO_3$ with a total of about 40.68 wt % $ClO_3^-$ were evaporated under about a 28-30 mm Hg vacuum at temperatures between about 40° C.-60° C. Liquid samples of the evaporated solution were taken from the flask during the evaporation process. In Examples 5-8 the solution was cooled to about 15° C.; in Example 9 the solution was cooled to about 5° C.; and in Example 10 the solution was cooled to about 0° C. After cooling, the solution phase was decanted from the precipitated sodium chlorate crystals and analyzed.

The results, given in Table IIIA below, show that the sodium ion, i.e. Na+ content, in the chloric acid can be significantly reduced to levels below about 1% as Na+. The highest chloric acid concentration achieved was about 51.39 wt %.

Table IIIB below shows the published solubility limits of sodium chlorate at 15°, 20° and 25° C. As can be seen, at 15° C. a saturated sodium chlorate solution has a $ClO_3^-/H_2O$ molar ratio of about 0.155. As shown by Examples 6, 7, 8, 9 and 10 in Table IIIA, $HClO_3/NaClO_3$ product solutions of the invention are produced having a higher $ClO_3^-/H_2O$ molar ratio than that of the saturated sodium chlorate solution.

commercial sodium chlorate solutions, as well as less sodium ion and less water.

EXAMPLE 11

A three compartment electrochemical cell is assembled having an anode, about 50 cm by about 25 cm, and a cathode of similar dimensions. The cell is constructed as shown in FIG. 1, being divided into three compartments by the use of two permselective perfluorinated membranes of NAFION 417. The construction provides that one membrane rests directly on the anode and the other directly on the cathode, while the middle compartment is filled with a compressible plastic mesh. The plastic mesh provides spacing of the membranes from one another by about 4 mm while promoting turbulence inside the middle compartment. The anolyte and catholyte compartments are constructed so that anolyte and gases produced at the anode and cathode can flow around the electrodes towards the exit of each chamber.

The chlorine dioxide generator is constructed having a reaction vessel consisting of a three neck 500 ml round flask having a bottom outlet. The bottom outlet is connected to a pump which circulates generator liquor through the anolyte compartment of the cell. The return anolyte from the generator is connected to the inlet of a cyclone separator that separates the chlorine dioxide gas and water vapor from the anolyte and returns it to the cell.

About a 45% solution of sodium chlorate is fed to the middle compartment of the cell at a continuous steady state rate of about 390 grams/hour. The cell is operated at a cell voltage of about 5.5 volts by passing a current of about 100.2 amperes from anode to cathode. Deionized water is continuously fed to the cathode compartment at about 142 grams per hour, and the caustic production rate is about 263 gms/hr at a concentration of about 25%. The caustic current efficiency is calculated to be about about 45%.

The effluent from the middle compartment is mixed with the recirculating anolyte prior to entering the cyclone. Chlorine dioxide is removed from the cyclone separator by means of a vacuum operated at about 200

TABLE IIIA

| Example No. | Solution Sp. Gr. | $HClO_3$- Wt % | $ClO_3$- Wt % | $NaClO_3$ Wt % | $HClO_4$ Wt % | Na+ Wt % | $HClO_3$ Molarity | $ClO_3$- Molarity | $ClO_3-/H_2O$ Wt Ratio | $ClO_3-/H_2O$ Molar Ratio |
|---|---|---|---|---|---|---|---|---|---|---|
| 5* | 1.3230 | 20.50 | 37.74 | 22.30 | 0.03 | 4.82 | 3.21 | 5.98 | 0.660 | 0.142 |
| 6* | 1.3161 | 32.65 | 41.14 | 11.33 | 0.03 | 2.45 | 5.09 | 6.49 | 0.734 | 0.159 |
| 7* | 1.3309 | 35.29 | 42.70 | 9.99 | 0.03 | 2.16 | 5.56 | 6.81 | 0.780 | 0.168 |
| 8* | 1.3474 | 42.04 | 46.52 | 6.35 | 0.03 | 1.37 | 6.71 | 7.51 | 0.901 | 0.195 |
| 9** | — | 42.72 | 45.30 | 2.58 | — | 0.56 | — | — | 0.828 | 0.179 |
| 10*** | — | 51.39 | 52.50 | 1.42 | — | 0.31 | — | — | 1.113 | 0.240 |

*Decanted product solution cooled to 15° C.
**Decanted product solution cooled to 5° C.
***Decanted product solution cooled to 0° C.

TABLE IIIB

| PUBLISHED SOLUBILITY OF SODIUM CHLORATE: | | | | | | |
|---|---|---|---|---|---|---|
| Temperature °C. | Solution Sp. Gr. | $NaClO_3$ Wt % | $ClO_3-$ Wt % | $ClO_3-$ Molarity | $ClO_3-/H_2O$ Wt Ratio | $ClO_3-/H_2O$ Molar Ratio |
| 15 | 1.4060 | 47.80 | 37.50 | 6.314 | 0.718 | 0.155 |
| 20 | — | 48.90 | 38.30 | — | 0.750 | 0.162 |
| 25 | 1.4240 | 50.00 | 39.20 | 6.689 | 0.784 | 0.169 |

Thus, the advantage with the $HClO_3/NaClO_3$ solutions of the invention having $ClO_3^-/H_2O$ ratios greater than about 0.155 is that there is more chlorate ion ($ClO_3^-$) available for chlorine dioxide production per weight or volume of solution than in the typically used mm of mercury (absolute).

The generator is initially filled with about 500 grams of a heated solution containing about 34.5 wt % sulfuric acid, and about 35.5 wt % sodium sulfate, and containing about 5 grams of ruthenium dioxide powder having a surface area of approximately 20 m²/gm.

The slurry from the generator is circulated through the anode compartment at about 70° C. by the pump at a rate of about 3 liters per minute.

A gas scrubber is connected between the generator and the vacuum source to collect the chlorine dioxide generated by reaction with a potassium iodide solution.

After one hour of operation, the generator reaches steady state conditions and a gas sample is collected for about 60 seconds. The $ClO_2$ production rate is about 111 grams/hr.

During a four hour period, the concentration of sodium sulfate and sulfuric acid in the generator remains constant, indicating that during steady state operation, no accumulation of salt occurs in the generator.

EXAMPLE 12

In this example, an electrochemically produced and concentrated chloric acid feed was fed into a chlorine dioxide generating apparatus containing a ruthenium oxide catalyst. The chlorine dioxide was educted into a $NaOH/H_2O_2$ solution to produce sodium chlorite for analysis of generator performance.

A titanium vessel with an inside diameter of about 3 inches and a height of about 10 inches and having a cone bottom with a bottom exit, a side entrance, and a top exit was used as the chlorine dioxide generating apparatus. A vacuum gauge, thermometer, and an eductor, providing a vacuum, were connected to the vessel. The eductor was operated using a solution of NaOH and $H_2O_2$ pumped from a tank top to which the effluent from the eductor was returned.

Into the eductor tank, about 500 grams of about 50 wt % NaOH, about 210 grams of $H_2O_2$, about 5 grams of $MgSO_4$ and about 14,285 grams of deionized water were added for a total of about 15,000 grams of solution. The chlorine dioxide reactor was charged with about 1000 grams of about 40 wt % $HClO_4$ and about 10 grams of powdered ruthenium oxide (Aldrich Chemical Co.). After applying a vacuum to the reactor, the heater was energized and the power regulated until the temperature was approximately 60° C. and the pressure was approximately 20 inches of mercury vacuum. Then about 606 grams of an electrochemically produced and concentrated chloric acid solution by the methods described in Examples 3 and 4 containing about 43.73 wt % $HClO_3$ and about 4.38 wt % $HClO_4$ with about about 2 wt % sodium content (as Na) was fed continuously to the reactor over about a four hour period. After this time, the feed to the generator was stopped, but generator heating was continued for about 1.5 hours longer until chlorine dioxide generation stopped. Gas produced from the reactor was educted into the product tank solution containing caustic and peroxide to produce sodium chlorite. Samples of the product tank were removed and analyzed iodometrically for sodium chlorite and by silver nitrate titration for chloride. The increase in chlorite concentration was used to monitor generator performance.

The results, which show the chlorine dioxide generator performance and the chloric acid yield conversion to chlorine dioxide, are expressed are as follows in Table IV:

TABLE IV

| Reactor Feed | | | | | |
| --- | --- | --- | --- | --- | --- |
| Run Time Hours | Solution gm | $HClO_3$ gm | $NaClO_2$ wt % | $ClO_2$ Made mg | % YIELD |
| 0 | 0 | 0 | 0 | | |
| 1 | 127 | 55 | 0.33% | 36.91 | 83.2% |
| 2 | 252 | 110 | 0.6% | 67.11 | 76.3% |
| 3 | 438 | 191 | 0.93% | 104.03 | 68.0% |
| 4 | 606 | 265 | 1.28% | 143.18 | 67.6% |
| 5.2 | 606 | 265 | 1.58% | 176.73 | 83.5% |
| 6.5 | 606 | 265 | 1.75% | 195.75 | 92.5% |
| Reactor Contents | | | Initial | Final | |
| $HClO_3$ | | | 0.0% | 0.6% | |
| $HClO_4$ | | | 40.0% | 40.0% | |

While the invention has been described above with references to specific embodiments thereof, it is apparent that many changes, modifications and variations in the materials, arrangements of parts and steps can be made without departing from the inventive concept disclosed herein. For example, in employing the process of the present invention with a reducing agent, the use of an oxygen-evolving catalyst may not be necessary. However, where a reducing agent is employed in conjunction with a catalyst, water is the preferred agent since it is present throughout the system in aqueous solutions and does not generate carbon dioxide or chlorine gas in the output stream. Other reducing agents, however, may be employed in the absence of a catalyst and which would be added to the chlorine dioxide generator to react before being fed into the three compartment cell. Appropriate reducing agents must possess the features of not interfering with the cell operation and performance, such as by forming coatings on the anode which would deactivate the electrocatalytic coating on the anode. Other suitable reducing agents are thought to include alcohols such as methanol or isopropanol, sugars such as glucose or sucrose, acids such as hydrochloric, oxalic, carboxylic, or formic, and aldehydes such as formaldehyde, as well as other well known reducing agents in the art. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for producing chlorine dioxide which comprises:
   a) reacting an aqueous solution of chloric acid and an alkali metal chlorate with a solution of a non-oxidizable acid in the presence of an oxygen-evolving catalyst or reducing agent in a reaction zone to Produce a gaseous mixture of chlorine dioxide gas, oxygen, water vapor and an aqueous solution of non-oxidizable acid and alkali metal salts of the non-oxidizable acid and chloric acid;
   b) separating the gaseous mixture of chlorine dioxide gas, oxygen and water vapor from the aqueous solution of the non-oxidizable acid and alkali metal salts of the non-oxidizable acid and chloric acid;
   c) feeding the aqueous solution of the non-oxidizable acid and alkali metal salts of the non-oxidizable acid and chloric acid to the anode compartment of an electrolytic cell having an anode compartment, a cathode compartment, and at least one ion exchange compartment between the anode compartment and the cathode compartment;
d) feeding an aqueous solution of an alkali metal chlorate to the ion exchange compartment;
e) electrolyzing the aqueous solution of the non-oxidizable acid and alkali metal salts of the non-oxidizable acid ions and chloric acid at the anode to produce oxygen gas, water vapor, hydrogen ions and alkali metal ions;
f) passing alkali metal ions and hydrogen ions from the anode compartment through a cation exchange membrane into the ion exchange compartment, the hydrogen ions displacing alkali metal ions of the alkali metal chlorate to produce an aqueous solution of chloric acid and alkali metal chlorate; and
g) passing alkali metal ions from the ion exchange compartment through a cation exchange membrane into the Cathode compartment.

2. The process of claim 1 in which the non-oxidizable acid is selected from the group consisting of sulfuric acid, perchloric acid, phosphoric acid and mixtures thereof.

3. The process of claim 1 in which the oxygen-evolving catalyst is a metal, an oxide and mixtures thereof of the elements of Group VIII of the Periodic Table of Elements.

4. The process of claim 3 in which the elements of Group VIII are platinum group metals.

5. The process of claim 4 in which the platinum group metals are selected from the group consisting of platinum, osmium, iridium, rhodium or ruthenium.

6. The process of claim 3 in which the oxygen-evolving catalyst is selected from the group consisting of an oxide of iridium, osmium, rhodium or ruthenium or a mixture of the oxides with platinum group metals or alloys of platinum group metals.

7. The process of claim 3 in which the oxygen-evolving catalyst is in solid particulate form.

8. The process of claim 7 in which the oxygen-evolving catalyst is separated from the aqueous solution of the non- oxidizable acid and alkali metal salt of the non-oxidizable acid.

9. The process of claim 7 in which the solution of the non-oxidizable acid and alkali metal salt of the non-oxidizable acid contains the oxygen-evolving catalyst.

10. The process of claim 1 accomplished by maintaining the chlorate ion concentration of the aqueous solution of chloric acid and alkali metal chlorate at a total chlorate ion to water molar ratio of about 0.15 or greater.

11. The process of claim 10 accomplished by evaporating the aqueous solution of chloric acid and alkali metal chlorate at sub-atmospheric pressures and temperatures of less than about 100° C.

12. The process of claim 12 accomplished by maintaining the temperature of the evaporation in the range of from about 30° C. to about 90° C.

13. The process of claim 10 accomplished by maintaining the chloric acid concentration in the aqueous solution of chloric acid and alkali metal chlorate at about 30% by weight or higher.

14. The process of claim 10 accomplished by evaporating the aqueous solution of chloric acid containing dissolved alkali metal chlorate at sub-atmospheric pressures and temperatures of less than about 100° C.

15. The process of claim 1 in which the alkali metal chlorate is selected from the group consisting of sodium chlorate, potassium chlorate, and lithium chlorate.

16. The process of claim 1 in which the conversion of alkali metal chlorate to chloric acid is in the range of from about 1 to about 99.9 percent.

17. The process of claim 1 in which the ion exchange compartment contains a cation exchange medium in the hydrogen form.

18. The process of claim 1 in which the catholyte is water or an alkali metal hydroxide solution.

19. The process of claim 16 in which the alkali metal chlorate is sodium chlorate.

20. The process of claim 1 accomplished by maintaining the residence time in the ion exchange compartment at from about 0.1 to about 120 minutes.

21. The process of claim 1 accomplished by maintaining the current density from about 0.1 to about 10 KA/m2.

22. The process of claim 1 in which the cathode compartment contains a cation exchange medium in the alkali metal form.

23. The process of claim 1 in which the ion exchange compartment contains a cation exchange medium in the hydrogen and sodium form.

24. The process according to claim 1 in which the reducing agent is one selected from the group consisting of water, sugars, alcohols, acids and aldehydes.

25. The process according to claim 24 in which the reducing agent is one selected from the group consisting of glucose and sucrose.

26. The process according to claim 24 in which the reducing agent is one selected from the group consisting of methanol and isopropanol.

27. The process according to claim 24 in which the reducing agent is an acid selected from the group consisting of hydrochloric, oxalic, carboxylic and 28. A process for producing chlorine dioxide which comprises:
a) reacting an aqueous solution of chloric acid and an alkali metal chlorate with a solution of a non-oxidizable acid in the presence of an oxygen-evolving catalyst or reducing agent in a reaction zone to produce a gaseous mixture of chlorine dioxide gas, oxygen, water vapor and an aqueous solution of non-oxidizable acid and alkali metal salts of the non-oxidizable acid and chloric acid;
b) feeding the aqueous solution of the non-oxidizable acid and alkali metal salts of the non-oxidizable acid and chloric acid to the anode compartment of an electrolytic cell having an anode compartment, a cathode compartment, and at least one ion exchange compartment between the anode compartment and the cathode compartment;
c) electrolyzing the aqueous solution of the non-oxidizable acid and alkali metal salts of the non-oxidizable acid ions and chloric acid at the anode to produce oxygen gas, water vapor, hydrogen ions and alkali metal ions; and
d) passing alkali metal ions and hydrogen ions from the anode compartment through a cation exchange membrane into the ion exchange compartment, the hydrogen ions displacing alkali metal ions of the alkali metal chlorate to produce an aqueous solution of chloric acid and alkali metal chlorate.

29. The process according to claim 28 further comprising separating the gaseous mixture of chlorine dioxide gas, oxygen and water vapor from the aqueous solution of the non-oxidizable acid and alkali metal salts of the non-oxidizable acid and chloric acid.

30. The process according to claim 29 further comprising feeding an aqueous solution of an alkali metal chlorate to the ion exchange compartment.

31. The process according to claim 30 further comprising passing alkali metal ions from the ion exchange compartment through a cation exchange membrane into the cathode compartment.

32. The process according to claim 31 further comprising selecting the non-oxidizable acid from the group consisting of sulfuric acid, perchloric acid, phosphoric acid and mixtures thereof.

33. The process according to claim 32 further comprising using a metal, an oxide and mixtures thereof of the elements of Group VIII of the Periodic Table of Elements as the oxygen-evolving catalyst.

34. The process according to claim 33 further comprising using the platinum group metals as the elements of Group VIII.

35. The process according to claim 34 further comprising selecting the platinum group metals from the group consisting of platinum, osmium, iridium, rhodium or ruthenium.

36. The process according to claim 35 further comprising selecting the oxygen-evolving catalyst from the group consisting of an oxide of iridium, osmium, rhodium or ruthenium or a mixture of the oxides with platinum group metals or alloys of platinum group metals.

37. The process according to claim 36 further comprising using the oxygen-evolving catalyst in solid particulate form.

38. The process according to claim 37 further comprising separating the oxygen-evolving catalyst from the aqueous solution of the non-oxidizable acid and alkali metal salt of the non-oxidizable acid.

39. The process according to claim 38 further comprising the solution of the non-oxidizable acid and alkali metal salt of the non-oxidizable acid containing the oxygen-evolving catalyst.

40. The process according to claim 39 further comprising maintaining the chlorate ion concentration of the aqueous solution of chloric acid and alkali metal chlorate at a total chlorate ion to water molar ratio of about 0.15 or greater.

41. The process according to claim 40 further comprising evaporating the aqueous solution of chloric acid and alkali metal chlorate at sub-atmospheric pressures and temperatures of less than about 100° C.

42. The process according to claim 41 further comprising maintaining the temperature of the evaporation in the range of from about 30° C. to about 90° C.

43. The process according to claim 42 further comprising maintaining the chloric acid concentration in the aqueous solution of chloric acid and alkali metal chlorate at about 30% by weight or higher.

44. The process according to claim 43 further comprising evaporating the aqueous solution of chloric acid containing dissolved alkali metal chlorate at sub-atmospheric pressures and temperatures of less than about 100° C.

45. The process according to claim 28 further comprising selecting the alkali metal chlorate from the group consisting of sodium chlorate, potassium chlorate, and lithium chlorate.

46. The process according to claim 28 further comprising the conversion of alkali metal chlorate to chloric acid is in the range of from about 1 to about 99.9 percent.

47. The process according to claim 28 further comprising the ion exchange compartment containing a cation exchange medium in the hydrogen form.

48. The process according to claim 28 further comprising using water on an alkali metal hydroxide solution as the catholyte.

49. The process according to claim 46 further comprising using sodium chlorate as the alkali metal chlorate.

50. The process according to claim 28 further comprising maintaining the residence time in the ion exchange compartment at from about 0.1 to about 120 minutes.

51. The process according to claim 28 further comprising of claim 1 maintaining the current density from about 0.1 to about 10 KA/m2.

* * * * *

UNITED STATES PATENT AND TRADEMARK OFFICE
CERTIFICATE OF CORRECTION

PATENT NO. : 5,248,397

DATED : September 28, 1993

INVENTOR(S) : David W. Cawlfield et al.

It is certified that error appears in the above—identified patent and that said Letters Patent is hereby corrected as shown below:

In column 1, line 53, delete "HCl03" and insert instead --$HClO_3$--.

In column 4, line 62, delete "HCl03/NaCl03" and insert instead --$HClO_3/NaClO_3$--.

In column 5, line 45, delete "0°" and "100°" and insert instead --0°C-- and --100°C--.

In column 7, line 7, delete "95" and insert instead --95%--.
In column 7, lines 27, 28, and 29 (four times) delete "KA/m2" and insert instead --$KA/m^2$--

In column 8, line 10, delete "inder" and insert instead --under--. In column 8, line 31, delete "S03" and insert instead --$SO_3$--.

In column 10, lines 8, 11, 14, 16, 18 (five times) delete "HCl03" and insert instead --$HClO_3$--. In column 10, lines 9, 12, and 14 delete "NaCl03" and insert instead --$NaCl)_3$--.

In column 12, line 63, delete "Ka/m2" and insert instead --$KA/m^2$--.

In column 13, line 56, delete "KA/m2" and insert instead --$KA/m^2$--. In column 13, line 67, delete "KwH" and insert instead --KWH--.

In column 15, line 44, delete "KA/m2" and insert instead --$KA/m^2$--.

In column 16, table (twice) delete "Cl03" and insert instead --$ClO_3^-$--.

UNITED STATES PATENT AND TRADEMARK OFFICE
CERTIFICATE OF CORRECTION

PATENT NO. : 5,248,397
DATED : September 28, 1993
INVENTOR(S) : David W. Cawlfield It is certified that error appears in the above-indentified patent and that said Letters Patent is hereby corrected as shown below:

In column 17, line 39, and tables (nine times) delete "ClO$_3$" and insert instead --ClO$_3^-$--. In column 17, line 63, delete "NaClo$_3$" and insert instead --NaClO$_3$--.

In column 20, line 56, delete "Produce" and insert instead --produce--.

In column 21, line 18, delete "Cathode" and insert instead --cathode--. In column 21, line 55, delete "12" and insert instead --11--.

In column 22, line 16, delete "KA/m2" and insert instead --KA/m$^2$--. In column 22, line 35, insert after and -- formic--.

In column 24, line 42, delete "KA/m2" and insert instead --KA/m$^2$--.

Signed and Sealed this

Fourth Day of July, 1995

Attest:

BRUCE LEHMAN

*Attesting Officer*    *Commissioner of Patents and Trademarks*